(12) United States Patent
Echols, Jr.

(10) Patent No.: US 7,336,741 B2
(45) Date of Patent: Feb. 26, 2008

(54) METHODS AND APPARATUS FOR SIGNAL PROCESSING OF MULTI-CHANNEL DATA

(75) Inventor: Billy G. Echols, Jr., Jackson, MS (US)

(73) Assignee: Verizon Business Global LLC, Basking Ridge, NJ (US)

( * ) Notice: Subject to any disclaimer, the term of this patent is extended or adjusted under 35 U.S.C. 154(b) by 666 days.

(21) Appl. No.: 10/869,886

(22) Filed: Jun. 18, 2004

(65) Prior Publication Data

US 2005/0281359 A1    Dec. 22, 2005

(51) Int. Cl.
*H03D 1/00*    (2006.01)
(52) U.S. Cl. ...................................... 375/343
(58) Field of Classification Search ............... 375/343, 375/224, 226, 227, 228, 340, 316, 377; 708/426, 708/422, 200, 100; 704/200, 201, 216, 217; 73/861.06, 861.05, 861
See application file for complete search history.

(56) References Cited

U.S. PATENT DOCUMENTS 6,404,759 B1 *  6/2002  Shoji ......................... 370/342
7,243,064 B2     7/2007  Paris

\* cited by examiner

*Primary Examiner*—Pankaj Kumar (57) ABSTRACT

Methods and apparatuses for processing multi-channel data are provided. A group of input signals are sampled. An average spectrum of the sampled group of input signals sampled over a predetermined number of time intervals is determined. An autocorrelation function based on the average spectrum and an average covariance based on results of the autocorrelation function over the predetermined number of time intervals may also be determined. A value based on a multinormal distribution of the sampled group of signal inputs sampled over the predetermined number of time intervals is determined.

25 Claims, 3 Drawing Sheets

METHODS AND APPARATUS FOR SIGNAL PROCESSING OF MULTI-CHANNEL DATA

FIELD OF THE INVENTION

The present invention relates to signal processing, and is more particularly related to methods and apparatuses for multi-channel signal processing.

BACKGROUND OF THE INVENTION

U.S. patent application Ser. No. 10/293,596, filed in the U.S. Patent and Trademark Office on Nov. 14, 2002, describes methods for signal processing of multi-channel data by extending linear prediction techniques. U.S. patent application Ser. No. 10/293,596 is hereby incorporated herein by reference in its entirety. U.S. Provisional Application No. 60/544,481, filed in the U.S. Patent and Trademark Office on Feb. 13, 2004, is related to U.S. patent application Ser. No. 10/293,596 and is hereby incorporated herein by reference in its entirety.

A 0-mean, stationary, possibly ergodic, stochastic ensemble of signals is noise. The noise may have an interesting spectral distribution, but it is noise, nevertheless. Most signal engineering tasks concern eliminating noise, not building filters to turn noise into something else. Signal processing concerns the distribution, control, and movement of signal power. Conventional signal processing theory uses the multi-normal distribution and its associated processes, such as Brownian motion, to replace signal power by the statistical concept of variance.

SUMMARY OF THE INVENTION

In a first aspect of the invention, a machine-implemented method of processing multi-channel data is provided. A group of input signals are sampled. An average spectrum of the sampled group of input signals sampled over a predetermined number of time intervals is determined. An autocorrelation function based on the average spectrum is determined. An average covariance is determined by using the autocorrelation function over the predetermined number of time intervals. A value based on a multinormal distribution of the sampled group of input signals sampled over the predetermined number of time intervals is determined.

In a second aspect, an apparatus is provided. The apparatus includes a first processing module configured to sample input signals, determine an average spectrum of the sampled input signals sampled over a predetermined number of time intervals, determine an autocorrelation function based on the average spectrum, determine an average covariance based on results of the autocorrelation function over the predetermined number of the time intervals, and determine a value based on a multinormal distribution of the sampled input signals sampled over the predetermined number of time intervals.

In a third aspect, a system is provided. The system includes a first processing module, a second processing module, an inverter to invert a second processed signal, a delay device to delay a first processed signal and a combiner to combine the delayed first processed signal and the inverted second processed signal. The first processing module is configured to receive amplified first signals representing desired sounds, and output the first processed signal based on averaging ones of the first signals received over a predetermined number of most recent time intervals. The second processing module is configured to receive amplified second signals representing undesired sounds, and output a second processed signal based on averaging ones of the second signals received over the predetermined number of most recent time intervals.

In a fourth aspect, a machine-readable medium is provided. The machine-readable medium contains instructions for controlling at least one processor to perform a method of processing a multi-channel data. The method includes sampling input signals, determining an average spectrum of the sampled input signals, determining an autocorrelation function based on the average spectrum, determining an average covariance based on results of the autocorrelation function over a predetermined number of time intervals, and determining a value based on a multinormal distribution of the sampled plurality of input signals over the predetermined number of time intervals.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Suppose one is tasked to design an amplifier to play Beethoven's nine symphonies. According to conventional communication theory, there is only one way to do this.

First, compute the nine power spectra $P_1(\omega), P_2(\omega), \ldots, P_9(\omega)$ and then form their average, weighted by the importance of each piece as measured by popularity or some other criterion:

$$P_{avg}(\omega) = \sum_{s=1}^{9} w_s P_s(\omega)$$

Next, find the autocorrelation function: $\rho_{avg}(\tau)$, $(-\infty < \tau < \infty)$ such that $$\lim_{T \to \infty} \frac{1}{2T} \int_{-T}^{T} \rho_{avg}(\tau) e^{-i\omega\tau} d\tau = P_{avg}(\omega).$$

(Note that the length, hence total energy, of a symphony is being treated as infinite.)

For each list of times $t_1 < t_2 \ldots < t_n$, form a symmetric correlation matrix using:

$$\sum_{avg}(t_1, t_2, \ldots, t_n) = \begin{pmatrix} \rho_{avg}(t_1 - t_1) & \cdots & \rho_{avg}(t_1 - t_n) \\ \vdots & \ddots & \vdots \\ \rho_{avg}(t_n - t_1) & \cdots & \rho_{avg}(t_n - t_n) \end{pmatrix}$$

and the associated multinormal distribution:

$$\phi_{t_1,\ldots,t_n}(x_1,\ldots,x_n) = \frac{1}{(2\pi)^{n/2}} \frac{1}{\sqrt{\det \sum_{avg}(t_1,\ldots,t_n)}} e^{-\frac{1}{2}\vec{x}^T \Sigma_{avg}^{-1}(t_1,\ldots,t_n)\vec{x}}.$$

The family of distributions $\{\phi_{t_1,\ldots,t_n}|-\infty<t_1<\ldots<t_n<\infty, n\geq 1\}$ meet the Kolmogroff criteria for defining a unique stochastic process $\{B_{avg}(t)|-\infty<t<\infty\}$.

$B_{avg}(t)$ is a 0-mean, stationary, possibly ergodic, random process which has the same spectral and autocorrelation properties as the original nine symphonies. In other words, $B_{avg}(t)$ is Beethoven noise and it is this noise process to which the standard communication theory applies. As the standard theory requires, the variance of $B_{avg}(t)$ is numerically, but not physically, distributed identically to the average power of the original music. According to standard theory, one would design and test algorithms according to the properties of Beethoven noise. However, one would never do this.

The real design process would be based on an understanding of characteristics of the original signals. Typically, this involves prototypes or exemplars rather than averages. For example, no matter how the sixth symphony appears in an average spectrum, any design would have to take into account high frequency piccolo "lightning" in a storm section, i.e., the high frequency power in $P_6(\omega)$. A prospective amplifier purchaser would listen for the "lightning" section. If the "lightning" section failed to stand out from the background sufficiently, the prospective purchaser would not buy the amplifier.

Although the above Beethoven example illustrates what appears to be a disconnect between practice and theory, it may be desirable to continuously sample and process multiple channel signals, such as power or other signals over a group of time intervals and to use a value of the multinormal distribution derived from the sampled signals over the group of time intervals. The following illustrates exemplary implementations that may continuously sample and process signals. Other implementations consistent with the principles of the invention may become obvious to those skilled in the art in view of the following description and appended claims.

Exemplary Wireless Transmitter

Figure 1:
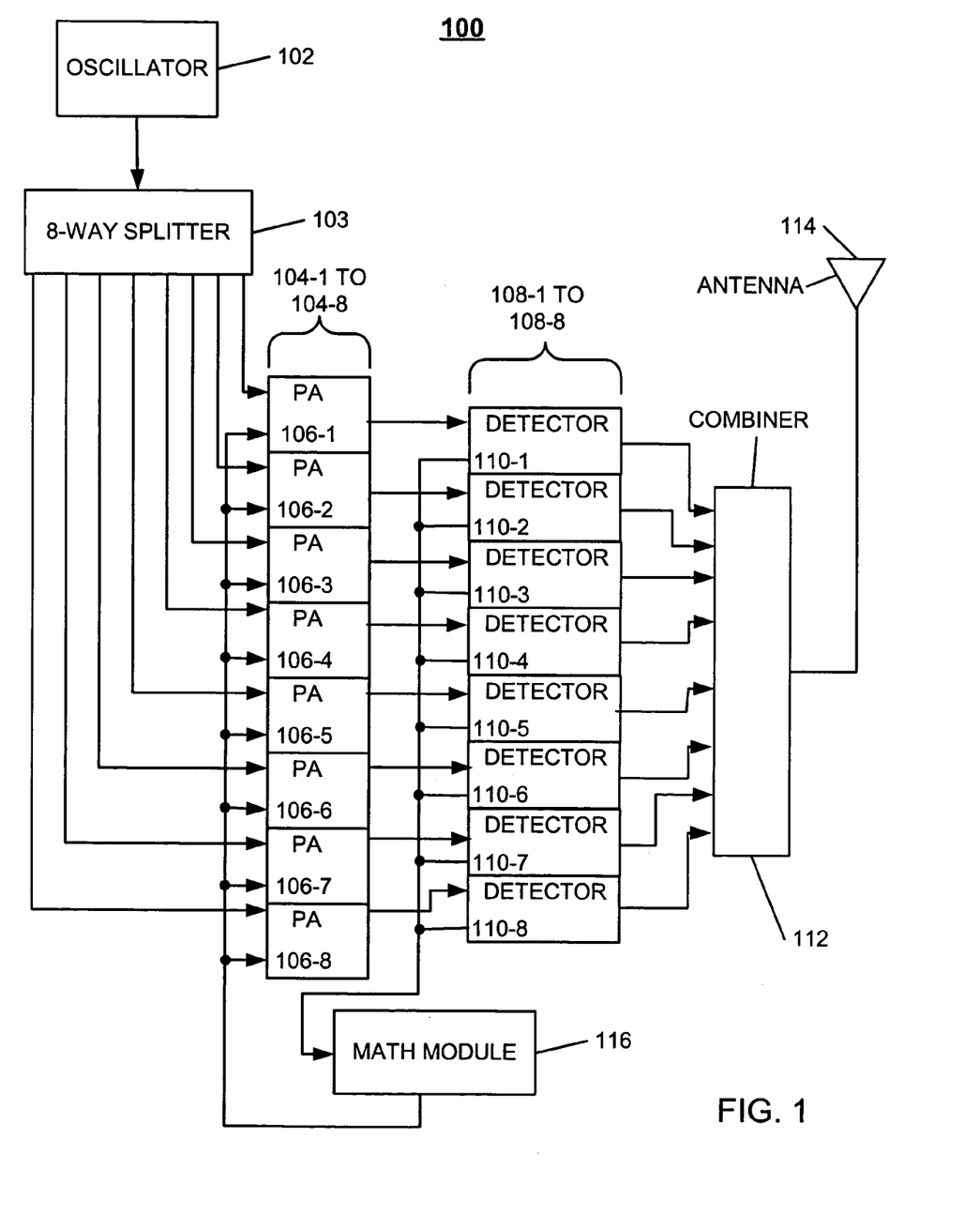
FIG. 1 illustrates a wireless transmitter consistent with principles of the present invention.

FIG. 1 is a block diagram of an exemplary wireless transmitter 100 consistent with the principles of the invention. Wireless transmitter 100 may include an oscillator 102, an 8-way splitter 103, power amplifiers 104-1 to 104-8, each with a serial peripheral interface input 106-1 to 106-8, respectively, detectors 108-1 to 108-8, each with a serial peripheral interface output 110-1 to 110-8, respectively, a combiner 112, an antenna 114 and a math module 116.

Oscillator 102 may generate a carrier signal that may be modulated to carry information by varying the frequency, time, phase, or amplitude of the carrier signal. The output of the power signal from oscillator 102 may be modulated and input to 8-way splitter 103, which splits the signal and outputs eight power signals. The split power signals may each be input to a different one of power amplifiers 104-1 to 104-8.

Each of power amplifiers 104-1 to 104-8 may receive a second input via serial peripheral interfaces 106-1 to 106-8 from math module 116. Each power amplifier 104-1 to 104-8 may amplify the received signal and output an amplified analog signal to detectors 108-1 to 108-8, respectively.

Each detector 108-1 to 108-8 may include, for example, two diodes that are embedded within a wave guide; one diode biased and positioned to detect forward power to antenna 114 and the other diode biased and positioned to detect reverse power received from antenna 114. The diodes rectify a small portion of energy. Most of the energy passes through the waveguide to combiner 112. Combiner 112 may combine the eight analog inputs and send a combined output to antenna 114 for transmission. The rectified portion of the energy may be routed through an analog-to-digital (A/D) converter to provide a continuous binary stream from serial peripheral interface outputs 110-1 to 110-8 to math module 116.

Math module 116 may be a Field Programmable Gate Array (FPGA), an Application Specific Integrated Circuit (ASIC), a Digital Signal Processor (DSP) or other type of computing device. Math module 116 may operate on the input digital stream from serial peripheral interface outputs 110-1 to 110-8 and route the resulting digital stream through a digital-to-analog (D/A) converter (not shown) before routing the analog signals to serial peripheral interface inputs 106-1 to 106-8 of power amplifiers 104-1 to 104-8, respectively.

Math module 116 may include a predistorter to smooth out any non-linearities (spikes) in the signals. Math module 116 may sample signals from serial peripheral interface outputs 110-1 to 110-8 at a rate exceeding the Nyquist limit, which in this implementation may be every 0.5 to 1.0 second. Math module 116 may calculate an autocorrelation function: $\rho_{avg}(\tau)$, where $(-\infty<\tau<\infty)$, as discussed above, such that $$\lim_{T\to\infty} \frac{1}{2T} \int_{-T}^{T} \rho_{avg}(\tau) e^{-i\omega\tau} d\tau = P_{avg}(\omega),$$

where $P_{avg}(\omega)$ is an average spectrum of signals input to math module 616. In this implementation, $P_{avg}(\omega)$ may be an average power spectrum.

For each list of times $t_1<t_2 \ldots <t_n$ math module 116 may determine average covariance, $\Sigma_{avg}(t_1, t_2, \ldots, t_n)$, by forming a symmetric correlation matrix according to:

$$\sum_{avg}(t_1, t_2, \ldots, t_n) = \begin{pmatrix} \rho_{avg}(t_1-t_1) & \cdots & \rho_{avg}(t_1-t_n) \\ \vdots & \ddots & \vdots \\ \rho_{avg}(t_n-t_1) & \cdots & \rho_{avg}(t_n-t_n) \end{pmatrix}$$

and may determine the associated multinormal distribution using:

$$\phi_{t_1,\ldots,t_n}(x_1,\ldots,x_n) = \frac{1}{(2\pi)^{n/2}} \frac{1}{\sqrt{\det \sum_{avg}(t_1,\ldots,t_n)}} e^{-\frac{1}{2}\vec{x}^T \Sigma_{avg}^{-1}(t_1,\ldots,t_n)\vec{x}}.$$

Math module 116 may take a number of samples of the input signals, for example, j samples over j time periods, and may calculate average covariance according to:

$$\sum_{avg}(t_1, t_2, \ldots, t_j) = \begin{pmatrix} \rho_{avg}(t_1 - t_1) & \cdots & \rho_{avg}(t_1 - t_j) \\ \vdots & \ddots & \vdots \\ \rho_{avg}(t_j - t_1) & \cdots & \rho_{avg}(t_j - t_j) \end{pmatrix}.$$

Thus, assuming that in one implementation, j=8, and samples are taken once per second, then every second, math module 116 may calculate $\Sigma_{avg}(t_1, t_2, \ldots, t_8)$ from the most recent 8 samples of the input signals. It follows, that the associated multinormal distribution is $$\phi_{t_1,\ldots,t_8}(x_1, \ldots, x_8) = \frac{1}{(2\pi)^{8/2}} \frac{1}{\sqrt{\det \sum_{avg}(t_1, \ldots, t_8)}} e^{-\frac{1}{2}\vec{x}^T \Sigma_{avg}^{-1}(t_1,\ldots,t_8)\vec{x}}$$

where $t_1, \ldots, t_8$ represent the samples taken at 8 time intervals and $x_1, \ldots, x_8$ represent the eight inputs.

Math module 116 may calculate $$\phi_{t_1,\ldots,t_8}(x_1, \ldots, x_8) = \frac{1}{(2\pi)^{8/2}} \frac{1}{\sqrt{\det \sum_{avg}(t_1, \ldots, t_8)}} e^{-\frac{1}{2}\vec{x}^T \Sigma_{avg}^{-1}(t_1,\ldots,t_8)\vec{x}}$$

and may convert the resulting digital output to analog form via a D/A converter and route the resulting analog signal to serial peripheral interface inputs 106-1 to 106-8 resulting in a new way to implement a forward feed loop.

In some implementations, math module 116 may also include one or more masks, such as, for example, a Federal Communication Commission (FCC) type mask. Math module 116 may then compare the continuous binary stream received from serial peripheral interface inputs 110-1 to 110-8 to alter the signals to better conform to the FCC type mask. In other implementations, math module 116 may use one or more masks to alter the signals for power control, pre-distortion, or any number of purposes.

Thus, implementations of wireless transmitter 100 may smooth out incoming signals according to a multinormal distribution of a most recent number of samples of input signals, such as the last 8 samples, and may further alter the signals according to one or more masks.

Wireless transmitter 100 is exemplary and may include more or fewer components than illustrated. For example, wireless transmitter 100 may have a 4-way splitter, instead of an 8-way splitter, along with four power amplifiers and four detectors. Further, wireless transmitter 600 may, instead, have a 16-way splitter, along with 16 power amplifiers and 16 detectors.

Exemplary Sound System

Figure 2:
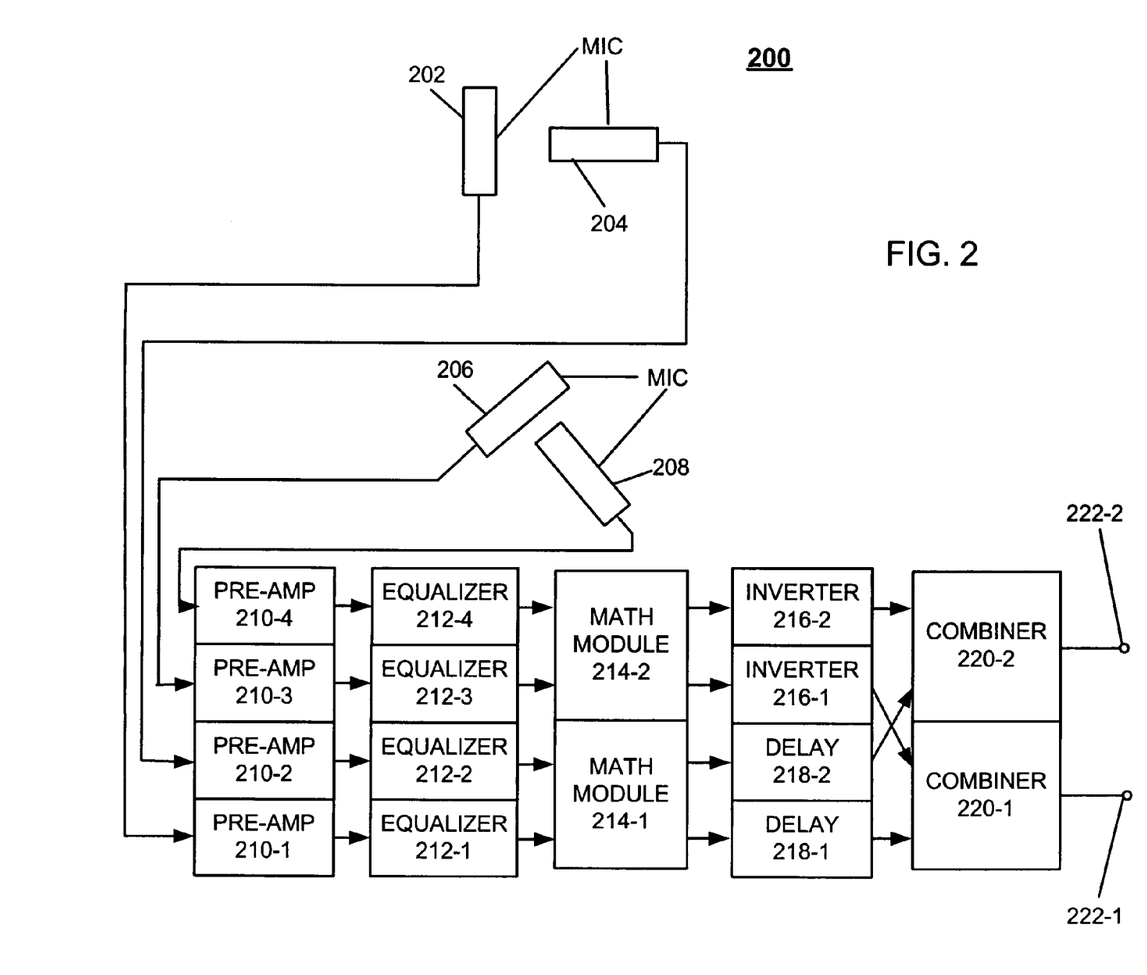
FIG. 2 illustrates a sound system consistent with the principles of the present invention.

FIG. 2 illustrates an exemplary sound system 200, consistent with the principles of the invention, for processing sound. Sound system 200 may include microphones 202, 204, 206 and 208, pre-amplifiers 210-1 to 210-4, equalizers 212-1 to 212-4, math modules 214-1, 214-2, inverters 216-1, 216-2, delays 218-1, 218-2, combiners 220-1, 220-2 and outputs 222-1, 222-2.

Microphones 202, 204 may be oriented 90 degrees out of phase with respect to each other and may be placed close to a source of sound that one wishes to hear, such as an orchestra. Microphones 206, 208 may be oriented 90 degrees out of phase with respect to each other and may be oriented 45 degrees out of phase with respect to microphones 202, 204. Microphones 206, 208 may be placed close to a source of sound one wishes to diminish or eliminate, such as an audience. Pre-amplifiers 210-1 to 210-4 may receive analog signals from microphones 202, 204, 206 and 208, respectively, may amplify the signals and may output the amplified signals to equalizers 212-1 to 212-4, respectively. Equalizers 212-1 and 212-2 may output shaped signals to math module 214-1 and equalizers 212-3 and 212-4 may output shaped signals to math module 214-2.

Math modules 214 may sample the signals from equalizers 212 at a rate that at least exceeds the Nyquist rate. Similar to exemplary wireless transmitter 100, one may determine an autocorrelation function: $\rho_{avg}(\tau)$, where $(-\infty<\tau<\infty)$, such that $$\lim_{T \to \infty} \frac{1}{2T} \int_{-T}^{T} \rho_{avg}(\tau) e^{-i\omega\tau} d\tau = P_{avg}(\omega)$$

where $P_{avg}(\omega)$ is an average spectrum of signals input to math modules 214. In this implementation, $P_{avg}(\omega)$ may be an average power spectrum.

For each list of times $t_1 < t_2 \ldots < t_n$, math modules 214 may form the following symmetric correlation matrix:

$$\sum_{avg}(t_1, t_2, \ldots, t_n) = \begin{pmatrix} \rho_{avg}(t_1 - t_1) & \cdots & \rho_{avg}(t_1 - t_n) \\ \vdots & \ddots & \vdots \\ \rho_{avg}(t_n - t_1) & \cdots & \rho_{avg}(t_n - t_n) \end{pmatrix}$$

along with the associated multinormal distribution $$\phi_{t_1,\ldots,t_n}(x_1, \ldots, x_n) = \frac{1}{(2\pi)^{n/2}} \frac{1}{\sqrt{\det \sum_{avg}(t_1, \ldots, t_n)}} e^{-\frac{1}{2}\vec{x}^T \Sigma_{avg}^{-1}(t_1,\ldots,t_n)\vec{x}}$$

Thus, math module 214-1 may determine $\phi_{t_1, \ldots, t_n}(x_1, \ldots, x_n)$ for the previous n time intervals, for example, each of the previous n seconds, from outputs of equalizers 212-1 and 212-2. Similarly, math module 214-2 may determine $\phi_{t_1, \ldots, t_n}(x_1, \ldots, x_n)$ for the previous n time intervals, for example, each of the previous n seconds, from outputs of equalizers 212-3 and 212-4. For example, when 8 time intervals are used, math modules 214 may calculate $\Sigma_{avg}(t_1, t_2, \ldots, t_n)$ and $\phi_{t_1, \ldots, t_n}(x_1, \ldots, x_n)$ from the signals sampled over the most recent 8 time intervals.

Outputs from math module 214-1 are received as input into delays 218-1, 218-2. Outputs from math module 214-2 are received as input into inverters 216-1, 216-2. Delays 218-1, 218-2 delay the signals such that they are timed to be output from the delays at about the same time as corresponding signals from inverters 216-1, 216-2. Both the signals output from delays 218 and the signals output from inverters 216 originated from microphones 202 to 208 at approximately the same time. The signals from delays 218 originated from microphones 202 and 204 (the sounds one desires to hear), while the signals from inverters 216 originated from microphones 206 and 208 (the sounds one wishes to diminish or eliminate).

Combiner 220-1 may receive the signals from inverter 216-1 and delay 218-1. Thus, combiner 220-1 may receive processed signals that originated from microphone 202 (desired sounds) and inverted processed signals that originated from microphone 206 (undesired sounds). When combiner 220-1 combines the signals, the inverted processed signals may eliminate or diminish any unwanted sounds picked up by microphone 206.

Similarly, combiner 220-2 may receive the signals from inverter 216-2 and delay 218-2. Thus, combiner 220-2 may receive processed signals that originated from microphone 204 (desired sounds) and inverted processed signals that originated from microphone 208 (undesired sounds). When combiner 220-2 combines the signals, the inverted processed signals may eliminate or diminish any unwanted sounds picked up by microphone 208. Combiners 220-1, 220-2 may output resulting signals to outputs 222-1, 222-2, respectively, which may then be fed to speakers to be output as amplified processed sound or alternatively, may be routed to a recording device, or to speakers and a recording device.

Math modules 214 may receive digital signals converted by A/D converters before being input to math modules 214. Outputs of math modules 214 may be digital signals, which may pass through corresponding inverters or delays to corresponding combiners in digital form. Alternatively, D/A converters may be included in paths between outputs of math modules 214 and inputs of combiners 220, such that inverters 216 and delays 218 receive analog signals.

Thus, in implementations of sound system 200 consistent with the principles of the invention, a multinormal distribution based on signals from a previous n time intervals may be used to diminish or eliminate unwanted sounds.

Sound system 200 is exemplary. Other implementations of sound system 200 may have more or fewer components. For example, sound system 200 may include additional sets of microphones and additional pre-amplifiers, equalizers, math modules, inverters, delays, combiners and outputs. Further, in some implementations of sound system 200, math modules 214, inverters 218 and delays 218 may be included in a processing device, such as, for example, a personal computer.

Exemplary Computer System

Figure 3:
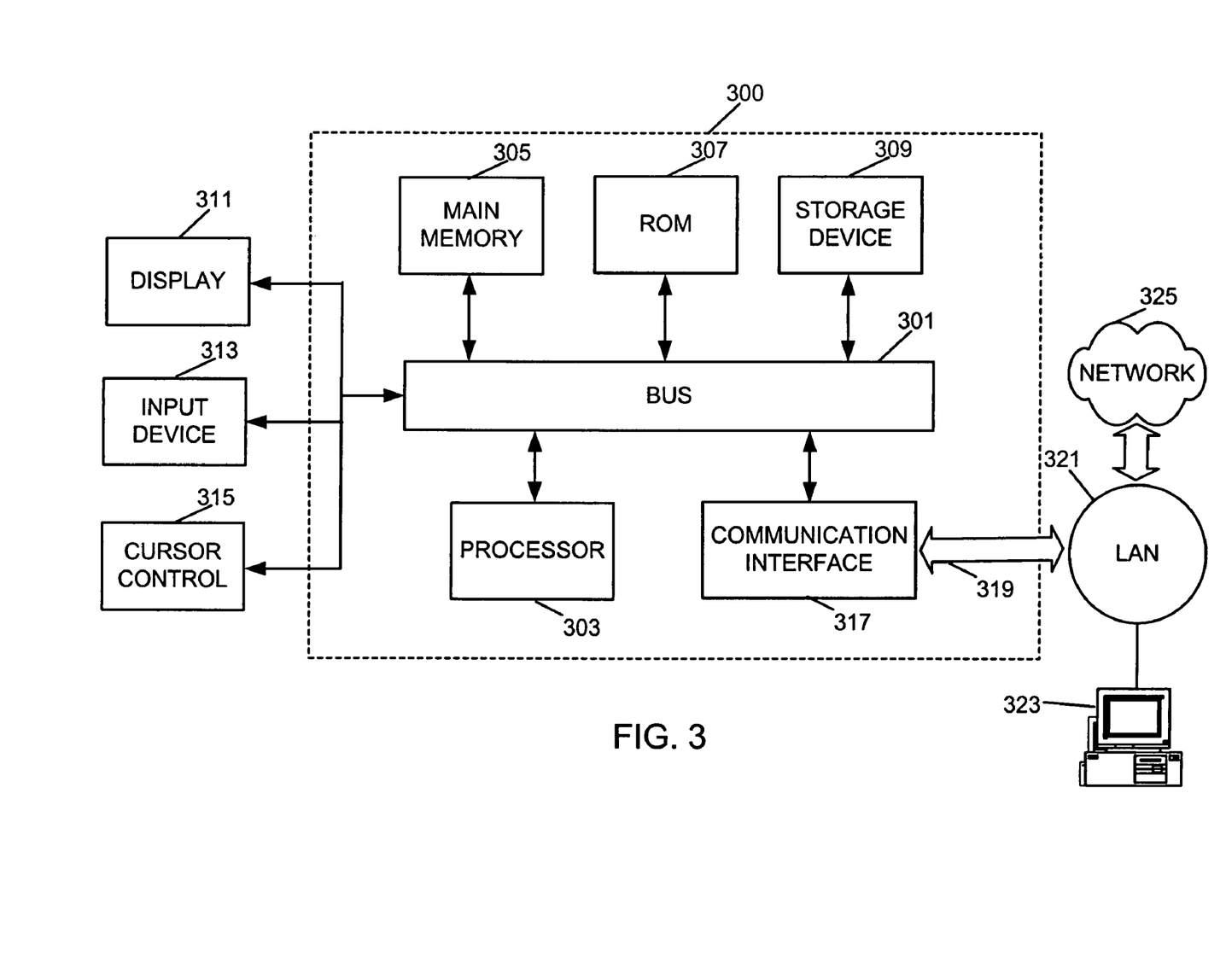
FIG. 3 is a diagram of a computer system that can be used to implement an embodiment of the present invention.

FIG. 3 illustrates a computer system 300 upon which an embodiment according to the present invention can be implemented. The computer system 300 includes a bus 301 or other communication mechanism for communicating information and a processor 303 coupled to the bus 301 for processing information. The computer system 300 also includes main memory 305, such as a random access memory (RAM) or other dynamic storage device, coupled to the bus 301 for storing information and instructions to be executed by the processor 303. Main memory 305 can also be used for storing temporary variables or other intermediate information during execution of instructions by the processor 303. The computer system 300 may further include a read only memory (ROM) 307 or other static storage device coupled to the bus 301 for storing static information and instructions for the processor 303. A storage device 309, such as a magnetic disk or optical disk, is coupled to the bus 301 for persistently storing information and instructions.

The computer system 300 may be coupled via the bus 301 to a display 311, such as a cathode ray tube (CRT), liquid crystal display, active matrix display, or plasma display, for displaying information to a computer user. An input device 313, such as a keyboard including alphanumeric and other keys, is coupled to the bus 301 for communicating information and command selections to the processor 303. Another type of user input device is a cursor control 315, such as a mouse, a trackball, or cursor direction keys, for communicating direction information and command selections to the processor 303 and for controlling cursor movement on the display 311.

According to one embodiment of the invention, processor 303 may include one or more processors, such as math module 616 or math modules 714 for executing an arrangement of instructions contained in main memory 305. Such instructions can be read into main memory 305 from another computer-readable medium, such as the storage device 309. Execution of the arrangement of instructions contained in main memory 305 causes processor 303 to perform the process steps described herein. In alternative embodiments, hard-wired circuitry may be used in place of or in combination with software instructions to implement the embodiment of the present invention. Thus, embodiments of the present invention are not limited to any specific combination of hardware circuitry and software.

The computer system 300 may also include a communication interface 317 coupled to bus 301. The communication interface 317 provides a two-way data communication coupling to a network link 319 connected to a local network 321. For example, communication interface 317 may be a digital subscriber line (DSL) card or modem, an integrated services digital network (ISDN) card, a cable modem, a telephone modem, or any other communication interface to provide a data communication connection to a corresponding type of communication line. As another example, communication interface 317 may be a local area network (LAN) card (e.g. for Ethernet™ or an Asynchronous Transfer Model (ATM) network) to provide a data communication connection to a compatible LAN. Wireless links can also be implemented. In any such implementation, communication interface 317 sends and receives electrical, electromagnetic, or optical signals that carry digital data streams representing various types of information. Further, the communication interface 317 can include peripheral interface devices, such as a Universal Serial Bus (USB) interface, a PCMCIA (Personal Computer Memory Card International Association) interface, etc. Although a single communication interface 317 is depicted in FIG. 3, multiple communication interfaces can also be employed.

The network link 319 typically provides data communication through one or more networks to other data devices. For example, the network link 319 may provide a connection through local network 321 to a host computer 323, which has connectivity to a network 325 (e.g. a wide area network (WAN) or the global packet data communication network now commonly referred to as the "Internet") or to data equipment operated by a service provider. The local network 321 and network 325 both use electrical, electromagnetic, or optical signals to convey information and instructions. The signals through the various networks and the signals on network link 319 and through communication interface 317, which communicate digital data with computer system 300, are exemplary forms of carrier waves bearing the information and instructions.

The computer system 300 can send messages and receive data, including program code, through the network(s), network link 319, and communication interface 317. In the Internet example, a server (not shown) might transmit requested code belonging an application program for implementing an embodiment of the present invention through the network 325, local network 321 and communication interface 317. Processor 303 may execute the transmitted code while being received and/or store the code in storage device 309, or other non-volatile storage for later execution. In this manner, computer system 300 may obtain application code in the form of a carrier wave.

The term "computer-readable medium" as used herein refers to any medium that participates in providing instructions to the processor 305 for execution. Such a medium may take many forms, including but not limited to non-volatile media, volatile media, and transmission media. Non-volatile media include, for example, optical or magnetic disks, such as storage device 309. Volatile media include dynamic memory, such as main memory 305. Transmission media include coaxial cables, copper wire and fiber optics, including the wires that comprise bus 301. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

CONCLUSION

Accordingly, the present invention provides an approach for performing multi-signal processing. Multiple signals may be processed to provide a multinormal family of distributions, $\phi_{t_1, \ldots, t_n}(x_1, \ldots, x_n)$, which is numerically, but not physically, distributed identically to the average of the multiple signals, $x_1, \ldots, x_n$, over a time series $t_1, \ldots, t_n$. The resulting multinormal family of distributions, $\phi_{t_1, \ldots, t_n}(x_1, \ldots, x_n)$, may be used in a number of different ways, such as in the disclosed implementations of wireless transmitter 100, to provide an output signal with little or no spikes, or in the disclosed implementations of sound processing system 200 to provide smoother signals for combining, such that signals representing mostly desired sounds and inverted signals representing mostly undesired sound may be combined to eliminate or reduce undesired sounds.

While series of acts have been described, the order of the acts is not critical. In addition, acts described above as being performed by one device/subsystem may alternatively be performed by another device/subsystem. Further, in still other alternative implementations, a single device/subsystem may perform all of the acts described above as being performed by a number of devices/subsystems. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A machine-implemented method of processing multi-channel data, the method comprising:
   sampling a plurality of input signals;
   determining an average spectrum of the sampled plurality of input signals over a predetermined number of time intervals;
   determining an autocorrelation function based on the average spectrum;
   determining an average covariance using the autocorrelation function over the predetermined number of time intervals; and
   determining a value based on a multinormal distribution of the sampled plurality of input signals sampled over the predetermined number of time intervals, the multinormal distribution being based on the average covariance.

2. The machine-implemented method of claim 1, wherein the determining an average covariance comprises:
   forming a symmetric correlation matrix.

3. The machine-implemented method of claim 2, wherein the forming the symmetric correlation matrix comprises:
   using the auto correlation function over a plurality of different time periods formed from the predetermined number of time intervals.

4. The machine-implemented method of claim 1, wherein the predetermined number of time intervals comprise most recent ones of time intervals.

5. The machine-implemented method of claim 4, further comprising:
   repeating, at a subsequent one of the time intervals, the acts of:
      sampling a plurality of input signals,
      determining an average spectrum of the sampled plurality of input signals over a predetermined number of time intervals,
      determining an autocorrelation function based on the average spectrum,
      determining an average covariance using the autocorrelation function over the predetermined number of time intervals, and
      determining a value based on a multinormal distribution of the sampled plurality of input signals sampled over the predetermined number of time intervals.

6. The machine-implemented method of claim 1, further comprising:
   providing the plurality of input signals, the providing comprising:
      receiving an input signal,
      splitting the input signal into the plurality of input signals,
      amplifying each of the plurality of input signals to provide a plurality of amplified signals, and
      rectifying each one of the amplified signals to provide a plurality of rectified signals.

7. The machine-implemented method of claim 6, further comprising:
combining the amplified signals to form a combined signal.

8. The machine-implemented method of claim 1, further comprising:
receiving first signals representing first sounds;
receiving second signals representing second sounds;
amplifying the first signals;
amplifying the second signals;
processing the amplified first signals based on a multinormal distribution over a predetermined number of time intervals;
processing the amplified second signals based on a multinormal distribution over the predetermined number of time intervals;
delaying the amplified processed first signals;
inverting the amplified processed second signals;
combining the delayed amplified processed first signals and the inverted amplified processed second signals to form combined signals; and
outputting the combined signals.

9. The machine-implemented method of claim 8, wherein the processing the amplified first signals and the processing the amplified second signals comprises:
sampling a plurality of input signals,
determining an average spectrum of the plurality of input signals over a predetermined number of time intervals,
determining an autocorrelation function based on the average spectrum,
determining an average covariance based on results of the autocorrelation function over the predetermined number of time intervals, and
determining a value based on a multinormal distribution of the plurality of input signals over the predetermined number of time intervals.

10. The machine-implemented method of claim 8, further comprising:
receiving the first sounds via a first microphone placed near an origin of desirable sounds, the first microphone providing the first signals; and
receiving the second sounds via a second microphone placed near an origin of undesirable sounds, the second microphone providing the second signals.

11. The machine-implemented method of claim 8, further comprising:
receiving the amplified first signals and shaping the amplified first signals; and
receiving the amplified second signals and shaping the amplified second signals.

12. An apparatus comprising:
a first processing module configured to:
sample a plurality of input signals;
determine an average spectrum of the sampled plurality of input signal sampled over a predetermined number of time intervals;
determine an autocorrelation function based on the average spectrum;
determine an average covariance based on results of the autocorrelation function over the predetermined number of time intervals; and
determine a value based on a multinormal distribution of the sampled plurality of input signals sampled over the predetermined number of time intervals, the multinormal distribution being based on the average covariance.

13. The apparatus of claim 12, wherein:
the predetermined number of time intervals comprise a number of most recent ones of time intervals.

14. The apparatus of claim 12, wherein the first processing module is configured to determine the average covariance based on the auto correlation function over a plurality of different time periods formed from the predetermined number of time intervals.

15. The apparatus of claim 12, further comprising:
a splitter for receiving a modulated signal and outputting a plurality of split signals;
a plurality of amplifiers, each of which is configured to receive a different one of the plurality of split signals and a secondary signal and output an amplified signal; and
a plurality of detectors, each of which is configured to receive a different one of the amplified signals from the plurality of amplifiers, wherein:
each of the plurality of detectors is configured to rectify a portion of the amplified signal and route the portion of the amplified signal to the first processing module as the plurality of input signals, and
the first processing module is configured to output the value based on the multinormal distribution of the plurality of sampled input signals over the predetermined number of time intervals to the plurality of amplifiers as the secondary signal.

16. The apparatus of claim 15, further comprising:
a plurality of analog-to-digital converters, each of which is configured to receive the portion of the amplified signal from a different one of the detectors and convert the portion of the amplified signal from analog to digital form before a converted portion of the amplified signal is provided to the first processing module.

17. The apparatus of claim 15, further comprising:
an antenna; and
a combiner arranged to receive a remaining respective portion of the amplified signal from each of the detectors and output a combined signal to the antenna for transmission.

18. The apparatus of claim 12, further comprising:
at least one first pre-amplifier configured to receive and amplify first signals representing first sounds, the first processing module being arranged to receive the amplified first signals as input;
at least one second pre-amplifier configured to receive and amplify second signals representing second sounds;
a second processing module configured to receive the amplified second signals as input, the second processing module being configured to output a value based on a multinormal distribution of the plurality of the second signals sampled over the predetermined number of the time intervals;
at least one delay device configured to receive a signal representing the output value from the first processing module and output a delayed signal;
at least one inverter configured to receive a signal representing the output value from the second processing module and output an inverted signal; and
at least one combiner configured to combine the inverted signal and the delayed signal.

19. The apparatus of claim 18, wherein the at least one combiner is configured to output a combination signal formed from the delayed signal and the inverted signal.

20. The apparatus of claim 18, further comprising:
at least one first microphone for receiving desired sounds; and at least one second microphone for receiving undesired sounds, wherein:

the at least one first microphone is configured to receive the desired sounds and provide the first signals representing the desired sounds to the at least one first pre-amplifier, and the at least one second microphone is configured to receive the undesired sounds and provide the second signals representing the undesired sounds to the at least one second pre-amplifier.

21. The apparatus of claim 18, further comprising:

at least one first equalizer configured to receive the amplified first signals and output shaped amplified first signals; and at least one second equalizer configured to receive the amplified second signals and output shaped amplified second signals, wherein:

the first processing module is arranged to receive the shaped amplified first signals, and the second processing module is arranged to receive the shaped amplified second signals.

22. A system for processing sound comprising:

a first processing module configured to:

receive amplified first signals representing desired sounds, and output a first processed signal based on averaging ones of the first signals representing desired sounds received over a predetermined number of most recent time intervals;

a second processing module configured to:

receive amplified second signals representing undesired sounds, and output a second processed signal based on averaging ones of the second signals representing undesired sounds received over the predetermined number of most recent time intervals;

an inverter configured to invert the second processed signal;

a delay device configured to delay the first processed signal; and a combiner configured to combine the delayed first processed signal and the inverted second processed signal.

23. The system of claim 22, wherein:

the first processing module is configured to output a plurality of the first processed signals having a variance identical to an average of a plurality of received amplified first signals, and the second processing module is configured to output a plurality of the second processed signals having a variance identical to an average of a plurality of received amplified second signals.

24. A machine-readable medium containing instructions for controlling at least one processor to perform a method of processing multi-channel data, the method comprising:

sampling a plurality of input signals;

determining an average spectrum of the sampled plurality of input signals;

determining an autocorrelation function based on the average spectrum;

determining an average covariance based on results of the autocorrelation function over a predetermined number of time intervals; and determining a value based on a multinormal distribution of the sampled plurality of input signals over the predetermined number of time intervals, the multinormal distribution being based on the average covariance.

25. The machine-readable medium of claim 24, wherein the predetermined number of intervals comprise a number of most recent ones of the time intervals.

* * * * *